3,708,504
MANUFACTURE OF NAPHTHALENE-1,8-DIOIC ANHYDRIDE
Otto Kratzer, Hubert Suter, and Friedrich Wirth, Ludwigshafen, Germany, assignors to Badische Anilin- & Soda-Fabrik Aktiengesellschaft, Ludwigshafen (Rhine), Germany
No Drawing. Filed May 25, 1971, Ser. No. 146,790
Int. Cl. C07d 7/24
U.S. Cl. 260—345.2    5 Claims

ABSTRACT OF THE DISCLOSURE

Manufacture of naphthalene-1,8-dioic anhydride by oxidizing acenaphthene with air in the presence of spherical supported catalysts of which the active composition contains from 1 to 15% by weight of vanadium pentoxide and at least 85% by weight of anatase.

---

The present invention relates to a new process for the manufacture of naphthalene-1,8-dioic anhydride ("naphthalic anhydride") by oxidizing acenaphthene with air in the gas phase in the presence of fixed supported catalysts.

Naphthalic anhydride, an important intermediate in the synthesis of dyes, has hitherto been prepared industrially by the oxidation of acenaphthene with chromium(VI) compounds in glacial acetic acid or dilute sulfuric acid. Although this process provides good yields, it is unsatisfactory for a number of technical and economical reasons, for example because the acidic chromium(VI) solutions are extremely corrosive and the regeneration of oxidizing agents and solvents is costly.

J. Soc. Org. Synth. Chem. Japan, 14, 725 (1956) discloses a method of converting acenaphthene to naphthalic anhydride by catalytic oxidation with air at temperatures above 360° C. in the presence of catalysts containing vanadium pentoxide. However, this process is even less satisfactory than the aforementioned liquid-phase process in view of its low yields and low space-time yields.

It is an object of the present invention to improve the catalytic gas-phase process for the manufacture of naphthalic anhydride from acenaphthene.

We have found that in the oxidation of acenaphthene with air in the presence of fixed supported catalysts containing vanadium pentoxide naphthalene-1,8-dioic anhydride ("naphthalic anhydride") may be obtained in good yields, purity and space-time yields by using a supported catalyst of which the support consists of spherical, inert, non-porous material and the active composition contains from 1 to 15% by weight of vanadium pentoxide and at least 85% by weight of anatase (based on the weight of the active composition), the amount of vanadium pentoxide being from 0.05 to 3% by weight of the total weight of the catalyst.

In addition to the vanadium pentoxide and the anatase, the active composition of the catalysts to be used in the process of the invention may contain up to 14% by weight of other catalytically active substances such as molybdenum trioxide, tungsten trioxide, chromium trioxide or phosphorus pentoxide.

Suitable carriers are primarily porcelain and calcined magnesium silicate. The catalysts are known per se and may be prepared by known methods. We particularly prefer to use catalysts comprising, as carrier, magnesium silicate spheres containing from 0.1 to 1.0 percent w./w. vanadium pentoxide and, as active composition, from 3 to 8 parts by weight of vanadium pentoxide and from 97 to 92 parts by weight of anatase.

Conveniently, the catalysts are placed in a plurality of tubes having a length of from 0.5 to 4.5 m. and an internal diameter of from 10 to 40 mm. and surrounded by a cooling medium such as fused salt. The temperature of the fused salt, which is intended to allow the exothermic reaction to be conducted substantially isothermally, is preferably between 300° and 380° C. and particularly 340° and 360° C. The concentration of the acenaphthene in the air is advantageously from 1 to 100 g. and preferably from 35 to 45 g. per m.$^3$ (S.T.P.). It is advisable to preheat the air and evaporate the acenaphthene therein. Depending on the salt bath temperatures, catalyst compositions and catalyst arrangements used, a yield of from about 70 to 90 g. of naphthalic anhydride per hour may be obtained using 1 kg. of catalyst and contact times of from 0.1 to 4 seconds.

The naphthalic anhydride may be isolated from the reaction gases in known manner, for example by precipitating the product from the gas stream with water, which may be conveniently sprayed into the stream of gaseous products. Further purification may be effected by dissolving the free acid thus obtained in sodium hydroxide solution, reprecipitating with sulfuric acid, separating and reconverting to the anhydride by heating.

Naphthalene-1,8-dioic anhydride is a valuable intermediate in the preparation of pigments and vat dyes, optical brighteners and plant protection agents.

EXAMPLE

An iron tube having a length of 3 m. and an internal diameter of 25 mm. was filled to a height of 2.7 m. with a catalyst (2,000 g.), the carrier consisting of 6-mm. spheres of calcined magnesium silicate containing a total of 0.36% w./w. of vanadium pentoxide, whilst the active composition consisted of 6% vanadium pentoxide and 94% anatase. Per hour, 4 m.$^3$ (S.T.P.) of preheated air containing 160 g. of acenaphthene evaporated therein (40 g. per m.$^3$) were passed through the tube, which was surrounded by a bath of fused salt maintained at a temperature of 355° C. The product gas leaving the reaction tube was sprayed with water in a spray tower and the precipitated crude naphthalic anhydride was separated from the aqueous suspension. There were thus obtained 185 g./hr. of crude naphthalic anhydride having a purity of 97%, this being equivalent to a yield of 87% of theory.

If the oxidation is carried out in a tube having a length of 1 m. and filled to a height of 60 cm. with catalyst (450 g.), maintaining a temperature of 350° C. and a correspondingly lower rate of gas flow, the same results are obtained.

We claim:
1. A process for the manufacture of naphthalene-1,8-dioic anhydride by oxidizing acenaphthene with air in the presence of fixed supported catalysts containing vanadium pentoxide, wherein a supported catalyst is used, of which the support consists of spherical, inert, non-porous material and the active composition contains from 1 to 15% by weight of vanadium pentoxide and at least 85% by weight of anatase based on the weight of the active com- position, the amount of vanadium pentoxide being from 0.05 to 3% by weight of the total weight of the catalyst.

2. A process as claimed in claim 1, wherein the reaction is carried out at from 340° to 360° C.

3. A process as claimed in claims 1 and 2, wherein the contact time of the acenaphthene/air mixture is from 0.1 to 4 seconds.

4. A process as claimed in claims 1 to 3, wherein the concentration of the acenaphthene in the air is from 35 to 45 g./m.³ (S.T.P.).

5. A process as claimed in claims 1 to 4, wherein the catalyst is placed in tubes having a length of from 0.5 to 4.5 and an internal diameter of from 10 to 40 mm.

References Cited
UNITED STATES PATENTS
3,629,291  12/1971  Nohe _____ 260—345.2

JOHN M. FORD, Primary Examiner